(12) United States Patent
Mahajan

(10) Patent No.: US 10,300,736 B2
(45) Date of Patent: May 28, 2019

(54) METHOD AND DEVICE OF TRANSFERRING AN IMPRESSION FROM A SUBSTRATE TO A SURFACE

(71) Applicant: M/s. CAN IMAGE MEDIA TECH, Dist—Thane (IN)

(72) Inventor: Dayaram Sukhdev Mahajan, Thane (IN)

(73) Assignee: M/S. CAN IMAGE MEDIA TECH, Thane (IN)

( * ) Notice: Subject to any disclaimer, the term of this patent is extended or adjusted under 35 U.S.C. 154(b) by 99 days.

(21) Appl. No.: 15/121,401

(22) PCT Filed: Feb. 26, 2015

(86) PCT No.: PCT/IN2015/000111
§ 371 (c)(1),
(2) Date: Aug. 25, 2016

(87) PCT Pub. No.: WO2015/128881
PCT Pub. Date: Sep. 3, 2015

(65) Prior Publication Data
US 2016/0361945 A1 Dec. 15, 2016

(30) Foreign Application Priority Data
Feb. 26, 2014 (IN) .......................... 683/MUM/2014

(51) Int. Cl.
*E02F 9/28* (2006.01)
*B32B 21/02* (2006.01)
(Continued)

(52) U.S. Cl.
CPC ............ *B44C 1/1741* (2013.01); *B32B 21/02* (2013.01); *B32B 37/06* (2013.01); *B32B 37/10* (2013.01);
(Continued)

(58) Field of Classification Search
CPC .......... B27M 3/04; B32B 21/02; B32B 21/06; B32B 2255/12; B32B 2255/26;
(Continued)

(56) References Cited

U.S. PATENT DOCUMENTS

| | | |
|---|---|---|
| 4,985,337 A | 1/1991 | Sasa et al. |
| 5,098,772 A | 3/1992 | Strom |
| 2002/0061451 A1 | 5/2002 | Kita et al. |

OTHER PUBLICATIONS

Written Opinion for WO 2015/128881.*
(Continued)

*Primary Examiner* — Sonya M Sengupta
(74) *Attorney, Agent, or Firm* — MH2 Technology Law Group LLP

(57) ABSTRACT

The present invention relates to a device and method for transferring an impression from a substrate to a surface comprising a surface coated with first layer of release agent; either a second layer of polyvinyl acetate; and a third layer of mixture of acrylamide and styrene acetate or a single layer of mixture of polyvinyl acetate, acrylamide and styrene acetate; and having the impression to be transferred thereon, and a method of making the aforesaid device and transferring an impression from a substrate to a surface.

19 Claims, 3 Drawing Sheets

(51) Int. Cl.
  *B32B 37/06*   (2006.01)
  *B32B 37/10*   (2006.01)
  *B32B 38/00*   (2006.01)
  *B32B 38/06*   (2006.01)
  *B32B 38/08*   (2006.01)
  *E04F 15/10*   (2006.01)
  *B41M 5/52*    (2006.01)
  *B44C 1/17*    (2006.01)
  *B44C 1/175*   (2006.01)

(52) U.S. Cl.
  CPC .............. *B32B 38/06* (2013.01); *B32B 38/08* (2013.01); *B32B 38/145* (2013.01); *B41M 5/5254* (2013.01); *B44C 1/1733* (2013.01); *B44C 1/1754* (2013.01); *B44C 1/1758* (2013.01); *E04F 15/107* (2013.01); *B32B 2307/718* (2013.01); *B32B 2309/02* (2013.01); *B32B 2309/04* (2013.01); *B32B 2309/12* (2013.01); *E02F 9/2883* (2013.01); *Y02P 10/212* (2015.11); *Y10T 428/249925* (2015.04)

(58) Field of Classification Search
  CPC ........ B32B 2260/028; B32B 2260/046; B32B 2307/718; B32B 2309/02; B32B 2309/04; B32B 2309/12; B32B 2310/0825; B32B 2317/12; B32B 2419/04; B32B 2451/00; B32B 2471/00; B32B 37/06; B32B 37/10; B32B 38/06; B32B 38/08; B32B 38/145; E04F 15/107; Y10T 428/249925; E02F 9/2883; Y02P 10/212
  USPC ................ 156/209, 235, 242, 247, 249, 289
  See application file for complete search history.

(56) References Cited

OTHER PUBLICATIONS

Lee W. Young (Authorized Officer), International Search Report dated Sep. 22, 2015, International Application No. PCT/IN2015/000111, filed Feb. 26, 2015, pp. 1-3.

* cited by examiner

METHOD AND DEVICE OF TRANSFERRING AN IMPRESSION FROM A SUBSTRATE TO A SURFACE

CROSS-REFERENCE TO RELATED APPLICATIONS

This application is a U.S. National Stage application of PCT/IN2015/000111, filed on Feb. 26, 2015, and is incorporated by reference herein in its entirety.

FIELD OF INVENTION

The present invention relates to a method and device of transferring an impression, such as marks or graphic or pictorial representations from a substrate to a surface.

BACKGROUND AND PRIOR ART

Image transfer techniques for transferring images from one surface to another including acrylic transfer, xylene transfer, caulking transfer, heat transfer, water transfer, paper image transfer, fabric image transfer, contact paper transfer, waxed paper transfer are known. The selection of a type of method for transferring image/impression from one surface to another usually depends upon the material on which matter is sought to be transferred. The appealing feature about transfer of image/impression from one surface to another is that after transfer of the image/impression, the effect achieved is as if the image/impression was printed or painted on the surface as opposed to just glued.

US89188 discloses a process for applying oil or other paintings from their primary flexible support to any suitable surface. The oil-colors used for the painting inter alia contain boiled linseed-oil and white lead. The primary surface on which the matter is painted upon is coated with three consecutive coats of adhesive such as starch glue. After the three layers are completely dried, two or more coats of a mixture composed of gum-arabic and flaxseed, dissolved in water, in the proportions of one part of gum and flaxseed to eight parts of water are applied. These two coats constitute temporary adhesive medium for connecting the painting with the canvass. After the aforesaid layers are dried, the said layers along with the painting are detached from the primary surface (canvass) by means of a muslin cloth or gauze which is placed on the canvass on top of the said layers. Thereafter, the muslin/gauze containing the painting is placed over a surface with the side of the painting facing the surface, for the purposes of transferring the painting to the surface. Upon such placement of painting on the surface, the painting containing layers of adhesive adheres to the surface, causing the painting to be transferred to the said desired surface. After transferring the painting onto the desired surface, water is sprayed on the said surface over the muslin/gauze on the painting which causes the muslin/gauze to fall off by itself. The said process enables an artist to paint at his studio at his convenience and paste the subject matter on the desired surface once the same is ready. However, the said prior art involves use of several coats of adhesive. As is clear from the description, in addition to the three layers of starch glue and two or more layers of gum-arabic and flaxseed dissolved in water already applied on the primary surface i.e. canvass, the aforesaid process requires the surface on which the matter is to be transferred to be coated with fat boiled oil containing calcinated white lead, which renders the oil adhesive. The use of such excessive amount of adhesive coating damages the surface on which matter is to be transferred. Further, the said prior art is suitable for transfer of matter only physically painted/drawn by an artist on a substrate, thereby excluding application of the aforesaid process to printed matter.

US20040218028 discloses a color image transfer method comprising performing solid printing of an image portion on a hydrophilic transfer sheet substrate having coated on a surface thereof a water-soluble resin with an aqueous ink solution containing a component that imparts the water-soluble resin with an adhesive property for a certain period of time by use of an ink jet printer; scattering heat-bondable resin powder onto the solid printed portion and fixing it thereto while removing the powder from portions other than the image portion; printing a sublimation ink on the solid printed image by use of an ink jet printer in register with the solid printed image; superimposing the thus printed image surface on an article to be transferred and then heat pressing it; and peeling off the transfer sheet from the article to be transferred by giving moisture to the transfer sheet. The said document further claims a color image transfer method wherein, after printing with the sublimation ink, the transfer sheet having heat-bondable resin powder image thereon with the sublimation ink being attached thereon is heated in advance to cause the sublimation ink to develop colours before superimposing the image surface on an article for the image to be transferred, heat pressing to bond to each other, and peeling off the transfer sheet by giving moisture. This method requires a special printer and special aqueous ink solution (sublimation ink) for printing on the hydrophilic transfer sheet substrate. The method is therefore dependent on the use of printers and more particularly a type of printer of specification suitable for printing on hydrophilic transfer sheet substrate. Further, the method requires means for heating the sheet for the purposes of bonding the colour image with the surface. Thus, the method has limitations on its use.

WO2013132339 discloses a method for treating a hydrophobic release layer of intermediate transfer member for use in a printing process in which a negatively charged aqueous inject ink including an organic polymeric resin and a colorant are jetted onto said layer, the claimed method comprising contacting the release layer, prior to jetting the ink, with a solution or dispersion in an aqueous solvent of a chemical agent which suppose to reduce the tendency of a jetted ink droplet that spreads on impinging upon the intermediate transfer member to bead under the action of the surface tension of the aqueous carrier of the ink. The said invention pertains to a process and system of indirect digital inkjet printing using aqueous inks. This method also requires a special printer of suitable specification for printing on hydrophobic release paper which uses a special aqueous ink. Thus, this method is also limited in its scope of application to a great extent.

US2002/0061451A1 discloses an intermediate transfer recording medium for use in a method which comprises the steps of: forming an image using an intermediate transfer recording medium on an object; and forming a protective layer on the image. The intermediate transfer recording medium comprises: a sheet substrate provided with a resin layer; and a transparent sheet provided with a receptive layer, the said transparent sheet provided with the receptive layer having been put on top of the sheet substrate provided with the resin layer so that the resin layer faces the transparent sheet on its side remote from the receptive layer, the said resin layer being separable from the transparent sheet to transfer the transparent sheet provided with the receptive layer onto an object, the transparent sheet portion including the receptive layer having been half cut in a specific shape. The said resin layer provided on the sheet substrate is composed mainly of a hydrosilylation-type silicone pressure-sensitive adhesive. The said transparent sheet in its side facing the resin layer may be subjected to release treatment to facilitate the separation of the said transparent sheet from the said resin layer. An image may be formed on the intermediate transfer recording medium by a conventional sublimation thermal transfer method or hot-melt thermal transfer method. A thermal transfer sheet is separately provided and used to form a thermally transferred image on the receptive layer in the intermediate transfer recording medium. The receptive layer with the image formed thereon is put on top of an object, and the assembly is pressed with heating to transfer the transparent sheet provided with the receptive layer onto the object. A suitable slip layer may be provided on the sheet substrate in its side remote from the resin layer from the viewpoint of improving carriability at the time of sheet feeding in the thermal transfer printer. The intermediate transfer recording medium is provided with identification marks. The identification marks detect the half cut portion of the receptive layer. The ink used in the above method is a die based ink. Hence, if an image formed in the manner disclosed in the aforesaid document is exposed to sunlight, the ink will wear off easily. Further, the image re-transferred onto an object must be laminated after such re-transfer to induce fastness properties to the image in the absence of which the image so re-transferred is susceptible to damage easily. The object on which the image is re-transferred from the intermediate transfer recording medium is plain paper, wood free paper, tracing paper and plastic film. Thus, the object on which the image so formed by the above invention is re-transferred is limited to paper and plastic. The image so formed by the above invention may not be suitable for re-transfer on rough, uneven or metal surfaces. Furthermore, the shape of the object of which image is to be re-transferred may be such as cards, postal cards, passports letter paper, report pads, notebooks, catalogs, cups and cases. Thus, the image so formed and method of transfer as claimed by the above invention is not suitable for re-transfer of the image so formed on objects of all sizes, thereby limiting the size of the object on which the image may be re-transferred. The formation of an image on the receptive layer is achieved only by thermal transfer method, which further limits the scope of the method. The transfer sheet portion including the receptive layer is necessarily subjected to half cutting to ensure that the image is printed only on the selected half cut region and only the said image so formed is re-transferred onto an object. The intermediate transfer recording medium and a method of transferring an image onto an object by means of said intermediate transfer recording medium as claimed under the above document therefore involves complex steps, requires a specific set up suitable for exclusive use of the invention disclosed in the above document and is limited in its scope of application.

U.S. Pat. No. 4,985,337 discloses an image forming method which comprises forming an image portion by exposing and developing an image forming material having light sensitive composition, and transferring only the image portion onto an image receiving material with the non-image portion of the image receiving material being exposed. The image forming material comprises a support; a releasing layer provided on said support wherein said releasing layer is formed of an ethylene-vinylacetate copolymer; and a light-sensitive layer is provided on said releasing layer to produce an imagewise portion corresponding to said exposing step, said light sensitive layer comprising a colorant, light-sensitive o-quinonediazide compound or compositions containing both of a photoacid generating agent and a compound having a bond decomposable with an acid, and a polymeric compound which is (a) a homopolymer of a first monomer represented by the formula $RCCOCH=CH_2$ wherein R in the said first monomer is an alkyl having 1 to 17 carbon atoms; or (b) a copolymer comprising the said first monomer and a second monomer. The copolymer used may be vinyl acetate-ethylene; vinyl acetate-styrene; vinyl acetate-vinyl propionate; or vinyl acetate-vinyl versatate. In the colored light-sensitive layer of the colored image forming material, dyes and pigments are added as colorant. It is preferable to use a pigment having an insoluble salt such as sulfonic acid, carbonic acid, amine etc. The image forming material is generally developed after imagewise exposure through a color separation mask to form an image. At this time, only the image portion is directly transferred and laminated onto an image receiving material from the image obtained on the support. Such image can be transferred on the image receiving material by means of laser printers. Further, the image formed and the method of transfer of the same is not suitable for transfer onto large and/or uneven or metal surfaces. The invention so claimed in the above document is limited to use of paper or plastic. The image forming and transferring method disclosed in the above document also involves complex steps, require a specific set up suitable for use of image forming material having light sensitive composition and is further limited in its scope of application.

U.S. Pat. No. 5,098,772 discloses a decal comprising a paper sheet base having a porous surface, a preformed sheet of plastic film applied with no intermediate layer directly to said porous surface such that it adheres well to the porous surface and adopts the texture of the same but does not penetrate it, and an image applied to the said plastic film. No release layer is interposed between the paper base and plastic film, nor is there need for any release agent to be incorporated in the paper or in the plastic film because the adherence between the paper base and plastic film is released by water. The paper base of the image is treated with water in order to make the paper soft so that it may be removed completely, leaving the coated image to appear in reverse on the plastic film of the support sheet. The decal paper used for transferring image must be porous and water absorbent. A paper with a smooth, glazed surface is not desirable. Further, if the decal is to be applied on an obscure/dark surface and the printing inks are transparent, it will be necessary to apply a white layer over the reverse image. Furthermore, only images of small size can be transferred by means of the aforesaid method and highly skilled labour is required for transferring the image onto a surface as disclosed in the above document as the decal so formed may crack/break if not handled with care. The invention disclosed in the above document is also therefore limited in its scope of application.

However, a uniform/common method and device of transferring an impression from a substrate to a surface of any type, which is cost effective, and easy in application is yet to be fully developed for use in day to day life.

OBJECT OF THE INVENTION

The object of the present invention is to overcome the disadvantages/shortcomings of the devices and methods known in the prior art by providing a method and device for transferring impression from a substrate to a surface which is not dependent on a printer or special ink or heating means and which does not have any limitation with respect to the size of the image/impression to be transferred or surface upon which an image/impression is to be transferred.

Another object of the present invention is to provide a method and device for transferring an impression from a substrate to a surface which could be metallic or non-metallic, even or uneven. The present invention is suitable for transferring an impression to any surface.

Yet another object of the present invention is to provide a method and device for transferring an impression of any size from a substrate to any surface.

Yet another object of the present invention is to provide a method and device for transferring an impression from a substrate to a surface, in which any means for impressing an impression may be used.

Yet another object of the present invention is to maintain quality control of the printing/impressing without compromising on the flexibility in application of the impression to any surface.

Yet another object of the present invention is to provide a device and method for transferring an impression from a substrate to a surface, which is easy to use and cost effective.

SUMMARY OF THE INVENTION

The present invention relates to a method of transferring an impression from a substrate to a surface comprising the following steps:
(i) Applying a release agent upon a side of the substrate and drying the same;
(ii) Applying polyvinyl acetate upon the said layer of the said release agent on the said substrate and drying the same;
(iii) Applying mixture of acrylamide and styrene acetate upon the layer of polyvinyl acetate on the said substrate and drying the same;
(iv) Impressing a mark or graphic or pictorial representation of someone or something (impression) on the layer of acrylamide and styrene acetate;
(v) Separating from the said substrate the coating/film of polyvinyl acetate, acrylamide and styrene acetate bearing the said impression;
(vi) Adhering the rear side of the said separated coating/film obtained in step (v) above on the said surface;
(vii) Applying water on the said coating/film bearing the said impression adhered to the said surface.

The present invention also relates to a method of transferring an impression from a substrate to a surface comprising the following steps:
(i) Applying a release agent upon a side of the substrate and drying the same;
(ii) Applying mixture of polyvinyl acetate, acrylamide and styrene acetate upon the said layer of the release agent on the substrate and drying the same;
(iii) Impressing a mark or graphic or pictorial representation of someone or something (impression) on the layer of mixture of polyvinyl acetate, acrylamide and styrene acetate;
(iv) Separating from the said substrate the coating/film of polyvinyl acetate, acrylamide and styrene acetate bearing the impression;
(v) Adhering the rear side of the said separated coating/film obtained in step (vi) above on the said surface;
(vii) Applying water on the said coating/film bearing the said impression adhered to the said surface.

The present invention also relates to a device for transferring an impression from a substrate to a surface made by the method described above comprising a substrate coated with a first layer of release agent, with or without adhesive; a second layer of polyvinyl acetate; a third layer of mixture of acrylamide and styrene acetate and having the impression to be transferred thereon.

The present invention further relates to a device for transferring an impression from a substrate to a surface made by the method described above comprising a substrate coated with a first layer of release agent, with or without adhesive; a second layer of mixture of polyvinyl acetate, acrylamide and styrene acetate; and having the impression to be transferred thereon.

DESCRIPTION OF THE INVENTION

The invention will now be described with reference to the accompanying drawings wherein same reference numerals are used to denote the same parts. However, it is made clear that the description only illustrates the invention and in no way limits the same.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Figure 1:
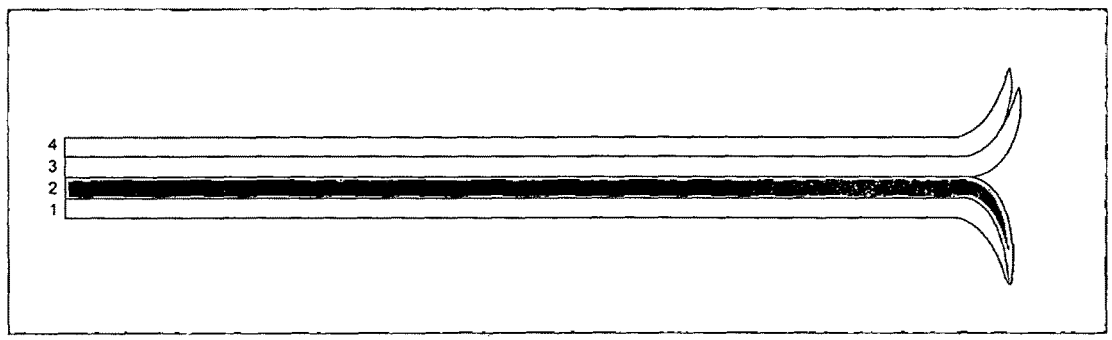
FIG. 1 shows a device comprising of layers of release agent, polyvinyl acetate and acrylamide and styrene acetate, wherein 1 is a Substrate; 2 is a layer of Release Agent; 3 is a Layer of polyvinyl acetate; and 4 is a Layer of acrylamide and styrene acetate.

In a preferable embodiment according to the present invention, the substrate (1) is a liner material, typically either paper or plastic films such as such as Super Calandered Kraft (SCK) paper, poly coated Kraft paper, Glassine, Clay Coated Kraft (CCK) paper, Machine Finished Kraft (MFK) paper or Machine Glazed (MG) paper or from plastic film such as BO-PET film (biaxially oriented), poly coated BO-PET film, BOPP (biaxially oriented PP film) or other Polyolefins typically made out of HDPE, LDPE or PP plastic resins.

A layer of release agent (2) is applied over the said substrate (1). The said release agent (2) may be selected from a group of silicone release agents. After application of layer of release agent (2) on the substrate, the same is allowed to dry. Thereafter, layer inter alia comprising of polyvinyl acetate (3), as prepared in the manner provided in the example provided herein below, is applied over the layer of release agent (2) on the substrate (1). The said layer of polyvinyl acetate (3) helps in the formation of the base coat. After application of the layer of polyvinyl acetate (3) over the release agent (2) on the substrate, the same is allowed to dry. After the said layer of polyvinyl acetate (3) has dried completely, a layer comprising of mixture of acrylamide and styrene acetate (4), as prepared in the manner provided in the example provided herein below, is applied over the said layer of polyvinyl acetate (3) on the substrate (1). The said layer comprising of mixture of acrylamide and styrene acetate (4) serve as the ink receptive coat. After application of the said layer of acrylamide and styrene acetate (4), the same is also allowed to dry. The layers of polyvinyl acetate and acrylamide and styrene acetate together form a coating/film which can be separated from the substrate. After the drying of the aforesaid layer (4), the impression to be transferred to a surface is impressed, either by means of a printer or by physically drawing/painting, on the substrate over the layer of acrylamide and styrene acetate (4). The impression so impressed on the substrate is now ready for transfer.

In another embodiment of the present invention, a single layer comprising of a mixture of polyvinyl acetate, acrylamide and styrene acetate is applied over the layer of the release agent (2) on the substrate (1). In the said mixture of polyvinyl acetate, acrylamide and styrene acetate, preferably polyvinyl acetate is 50% to 65%, acrylamide is 23% to 32% and styrene acetate is 12% to 18%.

In another embodiment of the present invention, in the mixture of acrylamide and styrene acetate, acrylamide is 55% to 60% and styrene acetate is 40% to 45%.

In yet another embodiment of the present invention, adhesive is applied either on the rear side of the coating/film after it is separated from the substrate or on the surface on which the impression is to be transferred or both.

In yet another embodiment of this invention, adhesive is applied on the layer of release agent of a second substrate; the coating/film of polyvinyl acetate, acrylamide and styrene acetate is separated from a first substrate having layer of release agent and transferred upon said second substrate having layer of release agent and layer of adhesive; and thereafter impression is printed/made thereon.

Before the impression impressed on the substrate is transferred to a surface, the surface upon which impression is to be transferred is cleaned to remove any dust or other foreign material. Thereafter, the coating/film of polyvinyl acetate, acrylamide and styrene acetate formed on the substrate in the manner described aforesaid bearing the said impression is separated from the substrate by peeling of the said coating/film from the substrate. After separating the coating/film bearing the impression from the substrate, the rear side of the said separated coating/film so obtained is adhered on the said surface.

After the coating/film bearing the impression is adhered to the surface, water is applied over the said coating/film on the surface. Application of water activates the polyvinyl acetate in the coating/film which enables the impression to conform to the contours and boundaries of the desired surface thereby infusing/merging itself with the desired surface.

In another embodiment of the present invention, after application of water on the surface, the said surface bearing the impression is dabbed to remove air bubbles or gaps, if any, formed between the impression and the surface.

Figure 2:
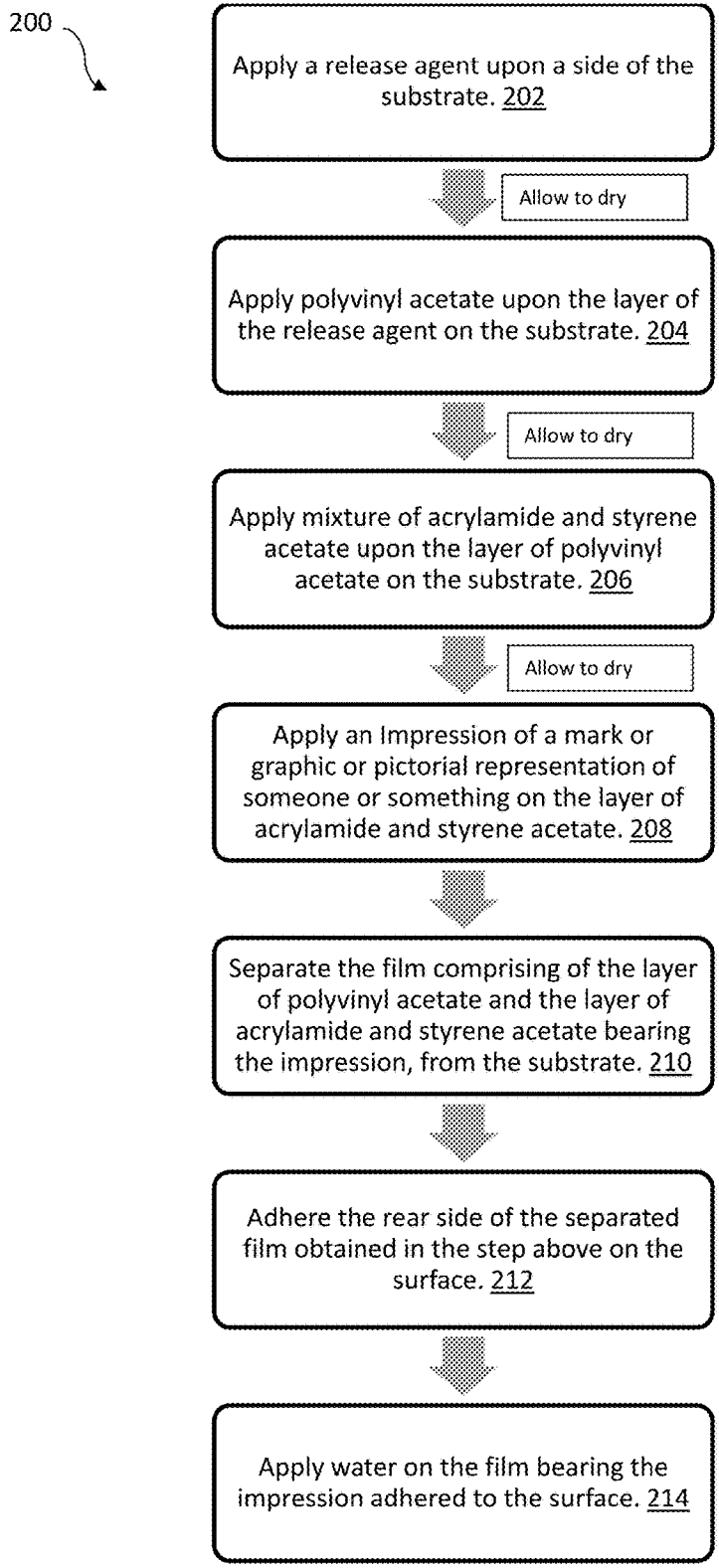
FIG. 2 shows a flowchart of a method of transferring an impression from a substrate to a surface.

FIG. 2 shows a flowchart of a method 200 of transferring an impression from a substrate to a surface. The method 200 includes applying a release agent upon a side of the substrate and drying the same, as at 202. The method 200 includes applying polyvinyl acetate upon the layer of the release agent on the substrate and drying the same, as at 204. The method 200 also includes applying mixture of acrylamide and styrene acetate upon the layer of polyvinyl acetate on the substrate and drying the same, as at 206. The method 200 further includes impressing a mark or graphic or pictorial representation of someone or something (impression) on the layer of acrylamide and styrene acetate, as at 208. The method 200 further includes separating from the substrate the film of polyvinyl acetate, acrylamide and styrene acetate bearing the impression, as at 210. The method 200 additionally includes adhering the rear side of the separated coating/film on the surface, as at 212. The method 200 further includes applying water on the coating/film bearing the impression adhered to the surface, as at 214.

Figure 3:
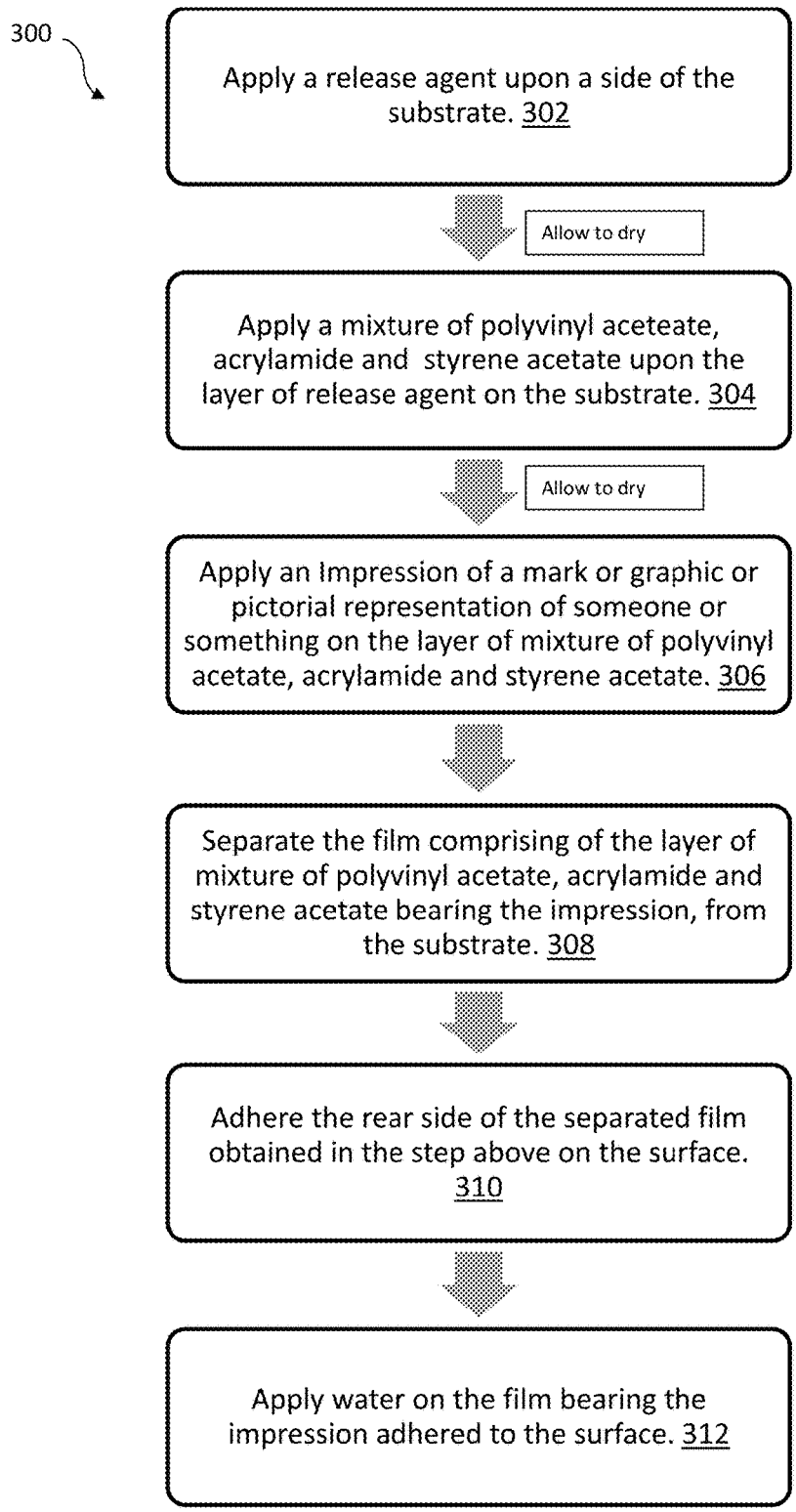
FIG. 3 shows a flowchart of another method of transferring an impression from a substrate to a surface.

FIG. 3 shows a flowchart of another method 300 of transferring an impression from a substrate to a surface. The method 300 includes applying a release agent upon a side of the substrate and drying the same, as at 302. The method 300 also includes applying mixture of polyvinyl acetate, acrylamide and styrene acetate upon the layer of the release agent on the substrate and drying the same, as at 304. The method 300 further includes impressing a mark or graphic or pictorial representation of someone or something (impression) on the layer of mixture of polyvinyl acetate, acrylamide and styrene acetate, as at 306. The method 300 further includes separating from the substrate the coating/film of polyvinyl acetate, acrylamide and styrene acetate bearing the impression, as at 308. The method 300 also includes adhering the rear side of the separated coating/film obtained on the surface, as at 310. The method 300 also includes applying water on the coating/film bearing the impression adhered to the surface, as at 312.

EXAMPLE

The chemical layers coated over the release agent on the substrate over the release agent are prepared as under:

Layer comprising of polyvinyl acetate is prepared as under:
  (i) Water is heated in a reactor between 70° C. and 90° C. Polyvinyl alcohol is added and stirred slowly for about an hour to make a solution of Polyvinyl alcohol;
  (ii) An anti-foaming agent is added to the aforesaid solution of Polyvinyl alcohol and the mixture is slowly stirred. The reactor is then sealed;
  (iii) An oxidising agent pre-dissolved in water is added into the aforesaid mixture in Step (ii) and the mixture is slowly stirred;
  (iv) Vinyl acetate monomer is added into the mixture in step (iii) for over an hour and the mixture is slowly stirred for about an hour while maintaining the temperature between 70° C. and 90° C.;
  (v) Again the oxidising agent dissolved in water is added to mixture in step (iv) and slowly stirred like in step (iii) and then Vinyl acetate monomer is slowly added into the above mixture over an hour;
  (vi) The process in step (v) may be repeated;
  (vii) During the above process, the pressure is controlled by condensation of gases and sending back the condensate to the reactor;
  (viii) The mixture is cooled to about room temperature.
  (ix) Whitening agent is, optionally, added to the above mixture.

Layer comprising of acrylamide and styrene acetate is prepared as under:
  (i) A solution comprising of acrylamide and water is added to a container and is heated between 70° C. and 90° C. while slowly stirring it;
  (ii) An oxidizing agent dissolved in water is added to the above solution of acrylamide;
  (iii) Styrene Acetate Monomer is added to the mixture in step (ii). The temperature of the mixture is maintained between 70° C. and 90° C.;
  (iv) In another reactor, water is heated between 70° C. and 90° C. and Polyvinyl alcohol is added and stirred for an hour;

(v) An anti-foaming agent is added into mixture in step (iv) and stirred slowly for about an hour. The reactor is then sealed;

(vi) An oxidising agent dissolved in water is slowly added into the mixture in step (v) and stirred;

(vii) Thereafter, Acrylamide and Styrene Acetate Monomer mixture in step (iii) and Anti foaming agent and oxidising agent mixture in step (vi) are slowly mixed and stirred for over an hour;

(viii) The mixture in step (vii) is cooled to room temperature.

In a preferable embodiment, percentage of acrylamide and styrene acetate in the above mixture is 60:40 to 55:45.

In another embodiment according to this invention, when white background is desired, whitening agent, preferably titanium dioxide is mixed in the mixture.

So also, different pigments may be added to the top coat chemical to give it different colours.

In another embodiment a single layer of a mixture of polyvinyl acetate, acrylamide and styrene acetate may be used in place of two separate layers wherein preferably polyvinyl acetate is 50% to 65%, acrylamide is 23% to 32% and styrene acetate is 12% to 18%.

In a preferable embodiment of the invention, the polyvinyl alcohol used is GH-17.

In another preferable embodiment, the anti-foaming agent is Octyl Alcohol.

In yet another preferable embodiment, the oxidising agent is Potassium Persulfate.

Advantages:
1. The present invention is suitable for application of an impression on a multitude of surfaces such as wall, ply, metal, tile, glass, wood, stone, shutters of shops, rooftops, flooring, all types of clothes, leather, vessels, toys, glass, metal, cement, plastic and other even or uneven surfaces among others;
2. The device as claimed herein is suitable for all types of printing e.g screen printing, offset printing, inkjet printing, digital printing, laser printing, flexo-printing, rotogravure printing, latex printing, printer using ultraviolet ink, photocopying among others.
3. The device as claimed herein is suitable for both water based and solvent based printing.
4. The device as claimed herein is PVC free.
5. The impression transferred by the method claimed herein can fit into the contours of any surface and get infused/merged with the surface
6. The impression transferred by the method claimed herein lasts longer.
7. The device and method claimed herein can be used for application of large advertisements on various surfaces conveniently and speedily.
8. The device and method do not require application of heat.
9. The device and method are cost effective, easy to use and save time in their application.

Many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact preparation and application illustrated and described, and accordingly, all suitable modifications and equivalents may be resorted to, falling within the scope of the invention.

The invention claimed is:

1. A method of transferring an impression from a substrate to a surface comprising the following steps:
   (i) applying a layer of a release agent upon a side of the substrate and drying the same;
   (ii) applying a layer of polyvinyl acetate upon the layer of the release agent on the substrate and drying the same;
   (iii) applying a mixture of acrylamide and a styrene acetate upon the layer of polyvinyl acetate on the substrate and drying the mixture;
   (iv) applying an impression of a mark or graphic or pictorial representation of a person or object on the layer of acrylamide and styrene acetate;
   (v) separating from the substrate a film of polyvinyl acetate, acrylamide and styrene acetate bearing the impression;
   (vi) adhering the rear side of the separated film obtained in step (v) above on the surface;
   (vii) applying water on the film bearing the impression adhered to the surface.

2. A method of transferring an impression from a substrate to a surface comprising the following steps:
   (i) applying a layer of a release agent upon a side of the substrate and drying the release agent;
   (ii) applying a layer of a mixture of polyvinyl acetate, acrylamide and styrene acetate upon the layer of the release agent on the substrate and drying the mixture;
   (iii) impressing an impression of a mark or graphic or pictorial representation of a person or object on the layer of the mixture of polyvinyl acetate, acrylamide and styrene acetate;
   (iv) separating from the substrate a film of polyvinyl acetate, acrylamide and styrene acetate bearing the impression;
   (v) adhering a rear side of the separated film obtained in step (iv) above on the surface;
   (vi) applying water on the film bearing the impression adhered to the surface.

3. A method of transferring an impression from a substrate to a surface as claimed in claim 1, wherein adhesive is applied either on a rear side of the film obtained in step (v) in claim 1 before adhering the rear side of the film on the surface, or over the surface before adhering the film obtained in step (v) in claim 1 on the surface.

4. A method of transferring an impression from a substrate to a surface as claimed in claim 2, wherein adhesive is applied either on a rear side of the film obtained in step (iv) in claim 2 before adhering the film obtained in step (iv) in claim 2 on the surface, or over the surface before adhering the film obtained in step (iv) in claim 2 on the surface.

5. A method of transferring an impression from a substrate to a surface as claimed in claim 2, wherein a second substrate with a release agent applied on the substrate as in steps (i) is obtained/made, and adhesive is applied on the layer of release agent of the second substrate, the film obtained in step (ii) in claim 2 is transferred upon the layer of adhesive on the second substrate and thereafter the remaining steps (iii) to (vi) in claim 2 are followed.

6. A method of transferring an impression from a substrate to a surface as claimed in claim 1, wherein the release agent comprises one or more silicone release agents.

7. A method of transferring an impression from a substrate to a surface as claimed in claim 2, wherein the release agent comprises one or more silicone release agents.

8. A method of transferring an impression from a substrate to a surface as claimed in claim 1 wherein, the substrate is a liner material selected from the group consisting of: Super Calandered Kraft (SCK) paper, poly coated Kraft paper, Glassine, Clay Coated Kraft (CCK) paper, Machine Finished Kraft (MFK) paper or Machine Glazed (MG) paper, and a plastic film selected from the group consisting of BO-PET film (biaxially oriented), poly coated BO-PET film, BOPP (biaxially oriented PP film) and other Polyolefins.

9. A method of transferring an impression from a substrate to a surface as claimed in claim 2 wherein, the substrate is a liner material selected from the group consisting of: Super Calandered Kraft (SCK) paper, poly coated Kraft paper, Glassine, Clay Coated Kraft (CCK) paper, Machine Finished Kraft (MFK) paper or Machine Glazed (MG) paper, and a plastic film selected from the group consisting of BO-PET film (biaxially oriented), poly coated BO-PET film, BOPP (biaxially oriented PP film) and other Polyolefins.

10. A method of transferring an impression from a substrate to a surface as claimed in claim 1, wherein, the layer of polyvinyl acetate is prepared by the following steps:
   (i) heating water in a reactor between 70° C. and 90° C., and adding Polyvinyl alcohol and stirred slowly for about an hour to make a solution of Polyvinyl alcohol;
   (ii) adding an anti-foaming agent to the solution of Polyvinyl alcohol, slowly stirring the mixture, and sealing the;
   (iii) dissolving an oxidising agent in water, adding the water and dissolved oxidising agent into the mixture in Step (ii), and slowly stirring the mixture;
   (iv) adding Vinyl acetate monomer into the mixture in step (iii) for over an hour and slowly stirring the mixture for about an hour while maintaining the temperature between 70° C. and 90° C.;
   (v) again adding the oxidising agent dissolved in water to the mixture in step (iv) and slowly stirring the mixture, and then slowly adding Vinyl acetate into the mixture over an hour;
   (vi) repeating the process in step (v);
   (vii) during the above process, controlling the pressure by condensation of gases and sending back the condensate to the reactor;
   (viii) cooling the mixture to about room temperature.

11. A method of transferring an impression from a substrate to a surface as claimed in claim 2 wherein, the layer of polyvinyl acetate is prepared by the following steps:
   (i) heating water in a reactor to between 70° C. and 90° C., adding Polyvinyl alcohol and slowly stirring for about an hour to make a solution of Polyvinyl alcohol;
   (ii) adding an anti-foaming agent to the solution of Polyvinyl alcohol stirring the mixture, and then sealing the;
   (iii) adding an oxidising agent pre-dissolved in water into the mixture in Step (ii) and slowly stirring the mixture;
   (iv) adding Vinyl acetate monomer into the mixture in step (iii) and slowly stirring for over an hour while maintaining the temperature of the mixture between 70° C. and 90° C.;
   (v) again adding the oxidising agent dissolved in water to mixture in step (iv) and slowly stirring, and then adding Vinyl acetate monomer into the mixture of step (v) over an hour;
   (vi) repeating step (v);
   (vii) during the above process of steps (i)-(v), controlling the pressure by condensation of gases and sending back the condensate to the reactor;
   (viii) cooling the mixture to about room temperature.

12. A method of transferring an impression from a substrate to a surface as claimed in claim 1, wherein the mixture of acrylamide and styrene acetate is prepared by the following steps:
   (i) adding a solution comprising acrylamide and water to a container and heating the solution to between 70° C. and 90° C. while slowly stirring the solution;
   (ii) adding an oxidizing agent dissolved in water to the solution of acrylamide;
   (iii) adding Styrene Acetate Monomer to the mixture in step (ii), while maintaining the temperature of the mixture between 70° C. and 90° C.;
   (iv) in another reactor, heating water to between 70° C. and 90° C., adding Polyvinyl alcohol, and stirring the water and polyvinyl alcohol for about an hour;
   (v) adding an anti-foaming agent into mixture in step (iv) and slowly stirring the mixture with the anti-foaming agent added for about an hour, then sealing the reactor;
   (vi) adding an oxidising agent dissolved in water into the mixture in step (v) and stirring the mixture with the oxidising agent dissolved in water added;
   (vii) thereafter, adding Acrylamide and Styrene Acetate Monomer into the mixture in step (iii), and adding Anti foaming agent and oxidising agent mixture in step (vi), then slowly mixing and stirring the mixture in step (iii) and the mixture in step (vi) for at an hour; and
   (viii) cooling the mixture in step (vii) to room temperature.

13. A method of transferring an impression from a substrate to a surface as claimed in claim 2, wherein the mixture of acrylamide and styrene acetate is prepared by the following steps:
   (i) adding a solution comprising of acrylamide and water to a container and heating the solution to between 70° C. and 90° C. while slowly stirring the solution;
   (ii) adding an oxidizing agent dissolved in water to the solution of acrylamide;
   (iii) adding Styrene Acetate Monomer to the mixture in step (ii) while maintaining the mixture at between 70° C. and 90° C.;
   (iv) in another reactor, heating water to between 70° C. and 90° C. and adding Polyvinyl alcohol to the water in the other reactor and stirring for an hour;
   (v) adding an anti-foaming agent into mixture in step (iv), slowly stirring for about an hour, and sealing the reactor;
   (vi) adding an oxidising agent dissolved in water into the mixture in step (v) and stirring;
   (vii) thereafter, mixing and stirring, over an hour, the Acrylamide and Styrene Acetate Monomer mixture in step (iii) and the Anti foaming agent and oxidising agent mixture in step (vi) are slowly mixed and stirred for over an hour; and
   (viii) cooling the mixture in step (vii) to room temperature.

14. A method of transferring an impression from a substrate to a surface as claimed in claim 1, wherein in step (iii) in the mixture of acrylamide and styrene acetate, acrylamide is 55% to 60% and styrene acetate is 40% to 45%.

15. A method of transferring an impression from a substrate to a surface as claimed in claim 2, wherein in the mixture of polyvinyl acetate, acrylamide and styrene acetate, polyvinyl acetate is 50% to 65%, acrylamide is 23% to 32% and styrene acetate is 12% to 18%.

16. A device for transferring an impression from a substrate to a surface prepared by the method as claimed in any one of claim 1, 3, 6, 8, 10, 12, or 14 comprising:

a substrate coated with a first layer of release agent, with or without adhesive;
a second layer of polyvinyl acetate;
a third layer of mixture of acrylamide and styrene acetate having the impression to be transferred thereon.

17. A device for transferring an impression from a substrate to a surface prepared by the method as claimed in any one of claim 2, 4, 5, 7, 9, 11, 13, or 15 comprising:
a substrate coated with a first layer of release agent, with or without adhesive;
a second layer of mixture of polyvinyl acetate, acrylamide and styrene acetate; and
a third layer of mixture of acrylamide and styrene acetate having the impression to be transferred thereon.

18. The method of claim 10 or 11, further comprising adding whitening agent to the mixture.

19. The device of claim 16 or 17, wherein the device is free from PVC.

* * * * *